(12) United States Patent
Kiefer et al.

(10) Patent No.: US 11,375,706 B2
(45) Date of Patent: Jul. 5, 2022

(54) REGULATING AND/OR CONTROL SYSTEM, AGRICULTURAL MACHINE COMPRISING SUCH A SYSTEM, AND METHOD FOR OPERATING AN AGRICULTURAL MACHINE

(71) Applicants: AMAZONEN-WERKE H. Dreyer GmbH & Co. KG, Hasbergen (DE); HYDAC Systems & Services GmbH, Sulzbach (DE)

(72) Inventors: Timo Kiefer, Saarlouis (DE); Georg Komma, Sankt Ingbert (DE); Peter Kohl, Blieskastel (DE); Patrick Krupp, Neuenkirchen (DE); Frank Grosse Prues, Bersenbrück (DE); Jochen Heer, Osnabrück (DE)

(73) Assignees: AMAZONEN-WERKE H. Dreyer SE & Co. KG; HYDAC Systems & Services GmbH

( * ) Notice: Subject to any disclaimer, the term of this patent is extended or adjusted under 35 U.S.C. 154(b) by 253 days.

(21) Appl. No.: 16/304,169

(22) PCT Filed: May 3, 2017

(86) PCT No.: PCT/EP2017/060501
§ 371 (c)(1),
(2) Date: Nov. 23, 2018

(87) PCT Pub. No.: WO2017/202581
PCT Pub. Date: Nov. 30, 2017

(65) Prior Publication Data
US 2020/0281182 A1 Sep. 10, 2020

(30) Foreign Application Priority Data
May 24, 2016 (DE) ...................... 10 2016 109 513.3

(51) Int. Cl.
*A01M 7/00* (2006.01)

(52) U.S. Cl.
CPC ................................. *A01M 7/0057* (2013.01)

(58) Field of Classification Search
CPC ................................................... A01M 7/0057
See application file for complete search history.

(56) References Cited

U.S. PATENT DOCUMENTS

| 5,988,528 A * | 11/1999 | Krohn | A01M 7/0075 239/168 |
| 8,942,893 B2 * | 1/2015 | Rosa | G05D 3/12 701/50 |

(Continued)

FOREIGN PATENT DOCUMENTS

| EP | 2559332 A1 | 2/2013 | |
| JP | 2004262292 A * | 9/2004 | B62D 55/116 |

(Continued)

OTHER PUBLICATIONS

Mizukura, Combine, 2004 (Year: 2004).*

Primary Examiner — Jeff A Burke
Assistant Examiner — Jamal A Shah
(74) Attorney, Agent, or Firm — Mintz, Levin, Cohn, Ferris, Glovsky and Popeo, P.C.

(57) ABSTRACT

A regulating and/or control system for an agricultural machine includes a distributor linkage for spreading material, such as fertilizer, plant protection products, or seeds, the distributor linkage being pivotable about at least one axis of rotation extending in the direction of travel, with at least one first sensor device for determining the inclination of the distributor linkage; and a data processing device for processing the sensor signals. The system further includes at least one second sensor device for determining the centrifugal force FF and/or the centrifugal acceleration aF acting upon the first sensor device when the machine is turning corners, where the data processing device is configured such (Continued)

Figure 3:
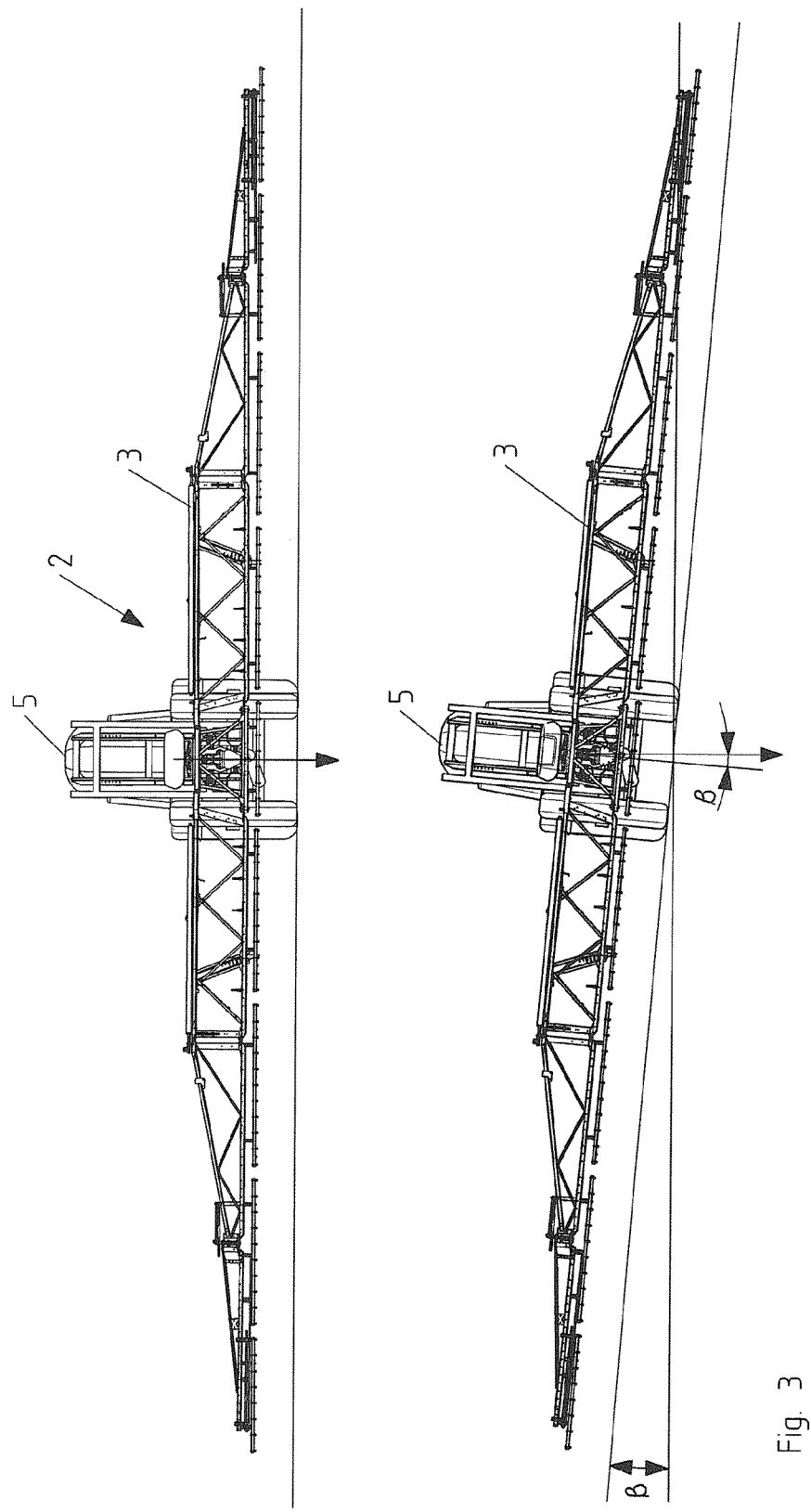

that an inclination measurement error of the first sensor device can be corrected based on the sensor signals of the second sensor device.

12 Claims, 5 Drawing Sheets

(56) References Cited

U.S. PATENT DOCUMENTS

| | | | |
|---|---|---|---|
| 2004/0124605 A1* | 7/2004 | McClure | A01B 79/005 |
| | | | 280/456.1 |
| 2016/0262370 A1* | 9/2016 | Leeb | A01M 7/0057 |
| 2016/0286780 A1* | 10/2016 | Leeb | A01C 23/008 |
| 2016/0316617 A1* | 11/2016 | Leeb | A01C 15/00 |
| 2016/0330948 A1* | 11/2016 | Schnaider | A01C 23/008 |
| 2017/0027103 A1* | 2/2017 | Grotelueschen | A01C 23/047 |
| 2018/0027727 A1* | 2/2018 | Leeb | A01M 7/0057 |

FOREIGN PATENT DOCUMENTS

| | | |
|---|---|---|
| WO | 2015/025015 A1 | 2/2015 |
| WO | 2015/040133 A1 | 3/2015 |

* cited by examiner

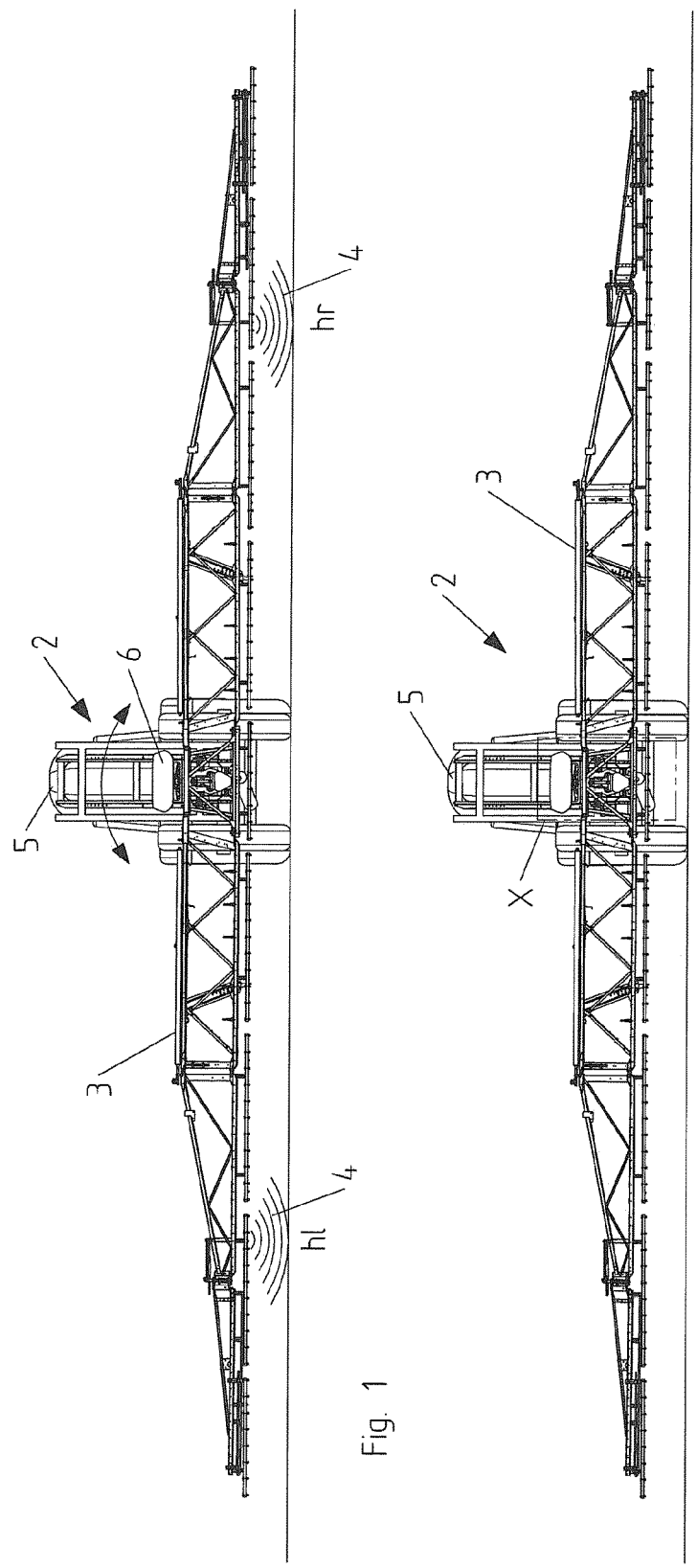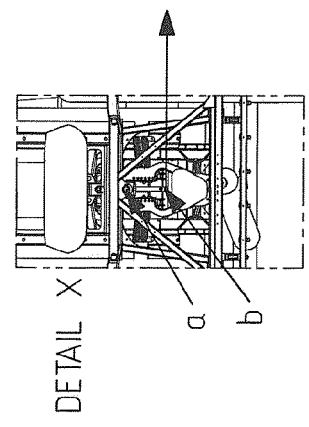
Fig. 1
Fig. 2

REGULATING AND/OR CONTROL SYSTEM, AGRICULTURAL MACHINE COMPRISING SUCH A SYSTEM, AND METHOD FOR OPERATING AN AGRICULTURAL MACHINE

The invention relates to a regulating and/or control system for an agricultural machine comprising a distributor linkage for spreading material, such as fertilizer, plant protection products or seeds. The distributor linkage is pivotable about at least one axis of rotation extending in the direction of travel. The regulating and/or control system comprises at least one first sensor device for determining the inclination of the distributor linkage and a data processing device for processing the sensor signals of the first sensor device.

Such a system is known, for example, from WO 2015 040 133 A1.

It is a disadvantage of the known system that the inclination sensors deliver faulty signals when corners are turned. To solve this, WO 2015 040 133 A1 proposes to measure, in addition to the inclination of the linkage, the angular rate about the axis of rotation extending in the direction of travel. The inclination angle of the linkage is calculated from the angular rate measured and an error-corrected angular position of the linkage is determined together with the measured angle of inclination. Only rolling motions of the carrier vehicle about the axis of rotation of the linkage extending in the direction of travel are recorded.

The invention is based on the object to improve the regulating and/or control system of the type mentioned above in terms of the measurement accuracy in various driving situations. The invention is further based on the object to provide an agricultural machine with such a system and a method for operating an agricultural machine.

In terms of the regulating and/or control system for an agricultural machine, the object is satisfied according to the invention by the object of claim 1. With regard to the agricultural machine and the method for operating an agricultural machine, the object is satisfied according to the invention by the object of claim 10 and the object of claim 12.

According thereto, the invention is based on the idea of providing a regulating and/or control system for an agricultural machine comprising a distributor linkage for spreading material, such as fertilizer, plant protection products or seeds. The distributor linkage is pivotable about at least one axis of rotation extending in the direction of travel. The system comprises at least one first sensor device for determining the inclination of the distributor linkage and a data processing device for processing the sensor signals. The invention is characterized by a second sensor device for determining the centrifugal force $F_F$ and/or the centrifugal acceleration $a_F$ acting upon the first sensor device when the machine is turning corners. The data processing device is configured such that an inclination measurement error of the first sensor device can be corrected based on the sensor signals of the second sensor device.

The invention has the advantage that the disturbance variable falsifying the measurement result, namely the centrifugal force $F_F$ and/or the centrifugal acceleration $a_F$, is determined directly at the first sensor device. Especially when turning corners, this leads to measurement errors being eliminated and the measurement accuracy being significantly improved.

Determining the centrifugal force $F_F$ and/or the centrifugal acceleration $a_F$ can be done in various ways. Determining the centrifugal force $F_F$ preferably takes place directly by measurement by the second sensor device. The centrifugal force $F_F$ and/or the centrifugal acceleration $a_F$ can also be carried out [sic] indirectly, for example, by a calculation based on vehicle parameters, such as the angular rate about the vertical axis and the driving speed, where the angular rate is preferably measured by the second sensor device.

Preferred embodiments of the invention are specified in the dependent claims.

In a preferred embodiment, the data processing device is adapted to process the travel speed of the machine. The driving speed is taken into account in the correction of errors based on the sensor signals of the second sensor device. Specifically, the driving speed is incorporated into the calculation of the centrifugal acceleration.

The data processing device can there be adapted to factorize the driving speed, where the factorization is adjustable. As a result, possible constant errors in the calculation can be compensated.

The data processing device can be adapted to process a steering angle of the machine which is taken into account in the error correction based on the sensor signals of the second sensor device.

The second sensor device can comprise at least one angular rate sensor which is adapted to measure the angular rate of the distributor linkage and/or the machine about the vertical axis. Based on the measurement of the angular rate about the vertical axis, the load of the first sensor device can be determined by lateral forces, for example, when corners are turned. The vertical axis is the axis about which the yaw motions of the distributor linkage and/or the machine arise, the angular velocity of which is measured by the angular rate sensor.

A further advantage of determining the angular rate about the vertical axis is that the error correction is very accurate when corners are turned continuously. In contrast thereto, inaccuracies can occur when corners are turned continuously due to drift effects in the correction by way of the known determination of the angular rate about the axis of rotation extending in the direction of travel.

In a further embodiment, the second sensor device can comprise several angular rate sensors, in particular at least two or three angular rate sensors, the measuring axes of which extend orthogonally relative to one another. This improves the measurement in the event that the second sensor device itself is inclined. The directions of rotation can be better determined in this manner, specifically by determining a resulting angular rate based on the measurements about the axes of rotation that extend orthogonally relative to one another.

The first sensor device can comprise an inclination sensor, in particular an inclination sensor for measuring the inclination of the distributor linkage with respect to a reference axis extending in the direction of the acceleration due to gravity (perpendicular direction). This has the advantage that regulation can be effected to an absolute inclination value relative to the direction of gravity, i.e. in the direction of the downward-acting gravity (weight force).

In a particularly preferred embodiment, the first sensor device comprises a sensor for determining the angular rate of the distributor linkage about the axis of rotation of the distributor linkage extending in the direction of travel. The sensor for determining the angular rate can be an angular rate sensor or an acceleration sensor. The sensor for determining the angular rate of the distributor linkage can be combined with the inclination sensor. This entails the advantage that the set point for the inclination can be specified by the user. Decoupling the machine motions from the linkage motions is done based on the signals from the sensor for determining the angular rate of the distributor linkage. The data processing device is adapted accordingly.

In the further preferred embodiment, at least one third sensor device is provided for determining the distance of the distributor linkage from the ground and/or from the plant population and/or from obstacles. The inclination of the distributor linkage is adjusted relative to the ground by way of the third sensor device.

The data processing device is preferably configured for an automatic mode for respective height and/or inclination adjustment of the distributor linkage and for an override mode for respective height and/or inclination adjustment of the distributor linkage. The override mode can be, for example, a manual override mode. In the automatic mode, the data processing device adjusts the overall height and/or the overall inclination of the distributor linkage. In the override mode, the data processing device overrides at least one control parameter of the automatic mode that is active in the override mode.

In the override mode, the data processing device overrides at least one control parameter of the automatic mode, in particular by manual input. Override mode means that the automatic mode is or remains active in the override mode when the override mode is activated in addition to the automatic mode. In other words, a control parameter of the automatic mode, for example, the absolute inclination value relative to the direction of gravity, is selectively changed in the override mode to give the user of the machine an opportunity to intervene in the automatic regulation, for example, for collision avoidance.

The override is preferably a manual override, i.e. an override which is at least triggered by manual input by a user. The manual override can also include the adjustment of the control behavior by the user. The automatic mode is the regulation during normal operation of the machine.

The override, with the automatic mode active, ensures that active decoupling of the motions of the distributor linkage from the motions of the machine, for example, due to the sensor for determining the angular rate of the distributor linkage about the axis of rotation extending in the direction of travel of the distributor linkage, is continued even if an intervention in the automatic regulation takes place, in particular a manual intervention. This makes it possible to respond to a driving situation which, for example, cannot be managed or not sufficiently well in the automatic mode, without the automatic control of the distributor linkage and thus the decoupling then being abandoned. This allows for precise and therefore safe intervention in the automatic regulation.

The data processing device is preferably configured for a manual mode with rigid power transmission to the distributor linkage, where a current inclination value of the distributor linkage is adopted as a new inclination set point when changing over to a decoupling mode with a decoupled distributor linkage, in particular to the automatic mode and/or to the override mode. It is possible to switch between the above operating modes. This configuration has the advantage that uncontrolled linkage motions are prevented when changing the mode of operation.

In connection with the agricultural machine for spreading material, such as fertilizer, plant protection products or seeds, it can preferably be provided that the second sensor device for determining the centrifugal force $F_F$ and/or the centrifugal acceleration $a_F$ acting upon the first sensor device when the machine is turning corners is arranged on the machine or on the distributor linkage.

The method according to the invention for operating an agricultural machine is based on material, such as fertilizer, plant protection products or seeds, being discharged from a storage container through a distributor linkage. In a decoupling mode with the distributor linkage decoupled, in particular in an override mode, regulation is effected to an absolute inclination value of the distributor linkage relative to the direction of gravity based on sensor signals of at least one first sensor device for determining the inclination of the distributor linkage. When corners are turned, a measurement error of the first sensor device is corrected based on sensor signals of at least one second sensor device for determining the centrifugal force $F_F$ and/or the centrifugal acceleration $a_F$ acting upon the first sensor device when the machine is turning corners. This improves measurement accuracy.

The invention shall be explained in more detail below using the embodiments with reference to the accompanying schematic drawings with further details, where:

FIG. 1 shows a rear view of an agricultural machine with a regulating and/or control system according to one embodiment of the invention;

FIG. 2 shows a rear view of the agricultural machine of FIG. 1, where the suspension of the distributor linkage outside the center of gravity is shown schematically;

FIG. 3 shows two rear views of the agricultural machine of FIG. 1 when driven straight ahead, where the upper diagram shows the distributor linkage parallel to ground and the lower diagram in a deflected state;

FIG. 4 shows two rear views of the agricultural machine of FIG. 1 when taking a left-hand turn, where the upper diagram shows the distributor linkage parallel to ground and the lower diagram in a deflected state;

FIG. 5 shows two rear views of the agricultural machine of FIG. 1 when taking a right-hand turn, where the upper diagram shows the distributor linkage parallel to ground and the lower diagram in a deflected state; and FIG. 6 shows a rear view of the agricultural machine of FIG. 1, where the acceleration components acting upon the first sensor device are shown when corners are turned (left-hand turn).

FIG. 1 shows schematically a rear view of an agricultural machine 2 which is configured as a field sprayer. The machine can be towed by a towing vehicle, be self-propelled, or mounted to a vehicle. The machine comprises a distributor linkage 3 which is connected to a storage container 5 for the supply of material to be spread. The material can be plant protection products, seeds or fertilizer. Distributor linkage 3 comprises nozzles known per se which are arranged distributed on the underside of distributor linkage 3. The nozzles are connected via a hose system, likewise known per se, to a pump and storage tank 5.

Distributor linkage 3 is suspended centrally on the frame of the machine and pivotable about an axis of rotation pointing in the direction of travel, as indicated by the double arrow. Adjustment of the overall inclination of distributor linkage 3, i.e. adjustment of the extended straight distributor linkage 3 is then possible.

In distributor linkage 3, axis of rotation a, about which distributor linkage 3 is pivotable, is spaced from center of gravity b of distributor linkage 3, as shown in FIG. 2. Due to the centrifugal force acting upon distributor linkage 3 which must be taken into account for the inclination regulation, this leads to a deflection of distributor linkage 3 when corners are turned. The centrifugal forces also act upon the inclination sensor(s) provided for inclination control. In order to avoid falsification of the measurement result (apparent vertical), the regulating and/or control system is adjusted accordingly, as described in more detail below.

The invention and the embodiments described below relate to a distributor linkage according to FIG. 2 with axis of rotation a spaced from center of gravity b of distributor linkage 3. It is also conceivable to apply the invention or the embodiments described below to a distributor linkage 3 in which axis of rotation a, about which distributor linkage 3 is pivotable, extends through center of gravity b.

Alternatively, distributor linkage 3 can comprise a central member arranged in a rotationally fixed manner on which a respective extension arm is hinged in a pivotable manner. An example of this is described in WO 2015/025015 A1. In this case, the two pivot arms are each pivotable about a center axis of the vehicle pointing parallel to the direction of travel.

Distributor linkage 3 is also adjustable in height. For this purpose, the distributor linkage can be attached to a vertically movable lifting frame. Alternatively, a parallelogram linkage can be provided to adjust the height level.

Hydraulic systems known per se or other actuating systems are conceivable as actuators for the inclination and height adjustment.

The invention is not restricted to a specific mechanism for inclination adjustment or for height adjustment of distributor linkage 3.

Agricultural machine 2 has a regulating and/or control system (not shown) comprising a data processing device for processing sensor signals from various sensor devices which are explained in more detail below.

The regulating and/or control system comprises a first sensor device, which is configured to determine the inclination of distributor linkage 3. The first sensor device comprises an inclination sensor for determining the inclination of distributor linkage 3 relative to the direction of gravity. The inclination sensor is based on the principle of measuring the inclination of distributor linkage 3 relative to the vertical direction predetermined by gravity or the direction of gravitational acceleration, respectively. This can be done in a manner known per se using a pendulum that is mechanically or electromagnetically mounted and the position of which is measured electronically, inductively, capacitively or optically. An example of such a pendulum is a system made of two adjacently disposed plate capacitors using a common center plate. If the sensor is inclined, the center plate of the differential capacitor shifts due to the gravitational acceleration such that the capacitance ratio changes. This change is evaluated and a corresponding output signal is generated. In the case of microelectromechanical sensors, the deflection relative to the direction of gravitational acceleration is determined by a spring-mass system.

In addition to the inclination sensor, the first sensor device can comprise a further sensor for determining the angular rate of the distributor linkage about axis of rotation a of the distributor linkage extending in the direction of travel. It can be an angular rate sensor or an acceleration sensor. In the case of a centrally suspended distributor linkage 3, a single angular rate sensor measuring the angular velocity during a rotary motion of distributor linkage 3 about centrally extending axis of rotation a can suffice. With a distributor linkage according to WO 2015/025015 A1 comprising a rotationally fixed center member and pivotable extension arms, each extension arm is advantageously associated with its own angular rate sensor.

The system comprises a second sensor device adapted to determine an angular rate, i.e. an angular velocity about the vertical axis of the distributor linkage or about the vertical axis of the associated vehicle. The vertical axis, also referred to as the yaw axis, is the vertical axis of the coordinate system fixed to the vehicle. Specifically, the second sensor device can comprise one or more angular rate sensors or acceleration sensors. To improve measurement accuracy, two or three rotation rate sensors arranged orthogonally to one another can be provided and combined to form an inertial measurement system.

In addition to the first and the second sensor device, a third sensor device is provided which measures the distance between distributor linkage 3 and the ground or the surface of the plant population. These are ultrasound sensors which are arranged on distributor linkage 3, in particular on the outer positions on distributor linkage 3 illustrated in FIG. 1. Other sensors for distance measurement are possible. In the example according to FIG. 1, two distance sensors 4 are provided for measuring the left and the right height $h_l$, $h_r$ of distributor linkage 3 relative to the ground.

The first and the second sensor device can be arranged at different positions on the distributor linkage and/or on the carrier vehicle or towing vehicle, respectively.

The regulating and/or control system operates as follows:

The data processing device enables various modes of operation. This allows the system to switch between an automatic mode, an override mode, and a manual mode. In the automatic mode, distributor linkage 3 is aligned by the third sensor device, i.e. by distance sensors 4 on distributor linkage 3, parallel to the ground or to the surface of the plant population, respectively. The control loops required for this are known per se. In the automatic mode, the linkage motions are actively decoupled from the machine motions. The first sensor device is responsible for this, specifically the angular rate sensor which measures the angular velocity about axis of rotation a of distributor linkage 3 extending in the direction of travel. The set point of this angular velocity is set to 0 in the automatic mode. As a result, the actuators responsible for the inclination, specifically the inclination cylinders, move continuously with the motions of the machine, whereby the transmission of forces and moments resulting from the machine motions onto distributor linkage 3 is prevented. In other words, the inclination cylinders follow the relative motions between distributor linkage 3 and machine 2. Distributor linkage 3 and machine 2 are therefore not rigidly connected by the inclination cylinders.

In the override mode, the user has the option of changing a control parameter such that the position, specifically the inclination position of distributor linkage 3, is changed without the active decoupling then being affected or even terminated. Maintaining active decoupling in the override mode, like in the automatic mode, is achieved by setting to zero the set point of the angular rate of distributor linkage 3 about the axis of rotation extending in the direction of travel. The inclination cylinders move continuously and prevent the transmission of forces or moments from machine 2 to distributor linkage 3.

The control intervention in the override mode is based on user input with respect to the absolute inclination angle of the distributor linkage relative to the direction of gravity. The direction of gravity used as a reference replaces the ground or population surface as a reference. Inclination control is therefore performed for an absolute inclination value relative to the direction of gravity. Inclination control based on the first sensor device is effected independently of the distance control to the ground or plant population.

This enables decoupling the machine motions from the motions of distributor linkage 3, regardless of the actual distance to the ground. The set point for the inclination is specified by the respective user. The inclination control regulates to the specified set point and at the same time actively decouples the linkage from the machine motions.

This target inclination angle can therefore be set manually, so that the inclination angle of distributor linkage 3 is changed by actuating the inclination cylinder according to user input. The active decoupling based on the angular rate of distributor linkage 3 is continued simultaneously.

In the manual mode, the distributor linkage is rigidly connected to the machine. The inclination cylinders transmit to distributor linkage 3 the forces and moments due to the machine motion. Active decoupling is terminated in the manual mode. The inclination cylinder can be moved to the left or the right as defined by the regulating and/or control system to rotate distributor linkage 3 accordingly.

It shall be explained below with reference to FIGS. 3 to 4 which forces act upon the inclination sensor when distributor linkage 3 is in different driving states. The correction of the measurement result is then explained. The mode of operation of the invention shall be explained in particular with reference to FIG. 6.

FIG. 3 shows distributor linkage 3 when driven straight ahead. There are no lateral forces acting on the inclination sensor. In the upper diagram, distributor linkage 3 is in the parallel position, firstly, relative to the ground and, secondly, relative to a plane perpendicular to the direction of gravity. The measured and actual angle between the vertical axis and in the direction of gravitational acceleration (gravity direction) is 0°. In the lower diagram, the machine 2 is laterally inclined together with distributor linkage 3, for example, when driving in a furrow with one side. The reference plane, normal to the direction of gravity, does not coincide with the ground surface shown schematically, but deviates from the ground surface by the angle beta. The same applies for the normal to the reference plane which deviates from the direction of gravity by the angle beta. The inclination sensor determines the orientation of distributor linkage 3 relative to the direction of gravitational acceleration (gravity direction) perpendicular to the ground, as seen in the lower diagram. When driven straight ahead, no lateral forces act upon the inclination sensor. Therefore, the measured and the actual angles coincide both in the parallel position (upper diagram) as well as in the inclined position (lower diagram).

Figure 4:
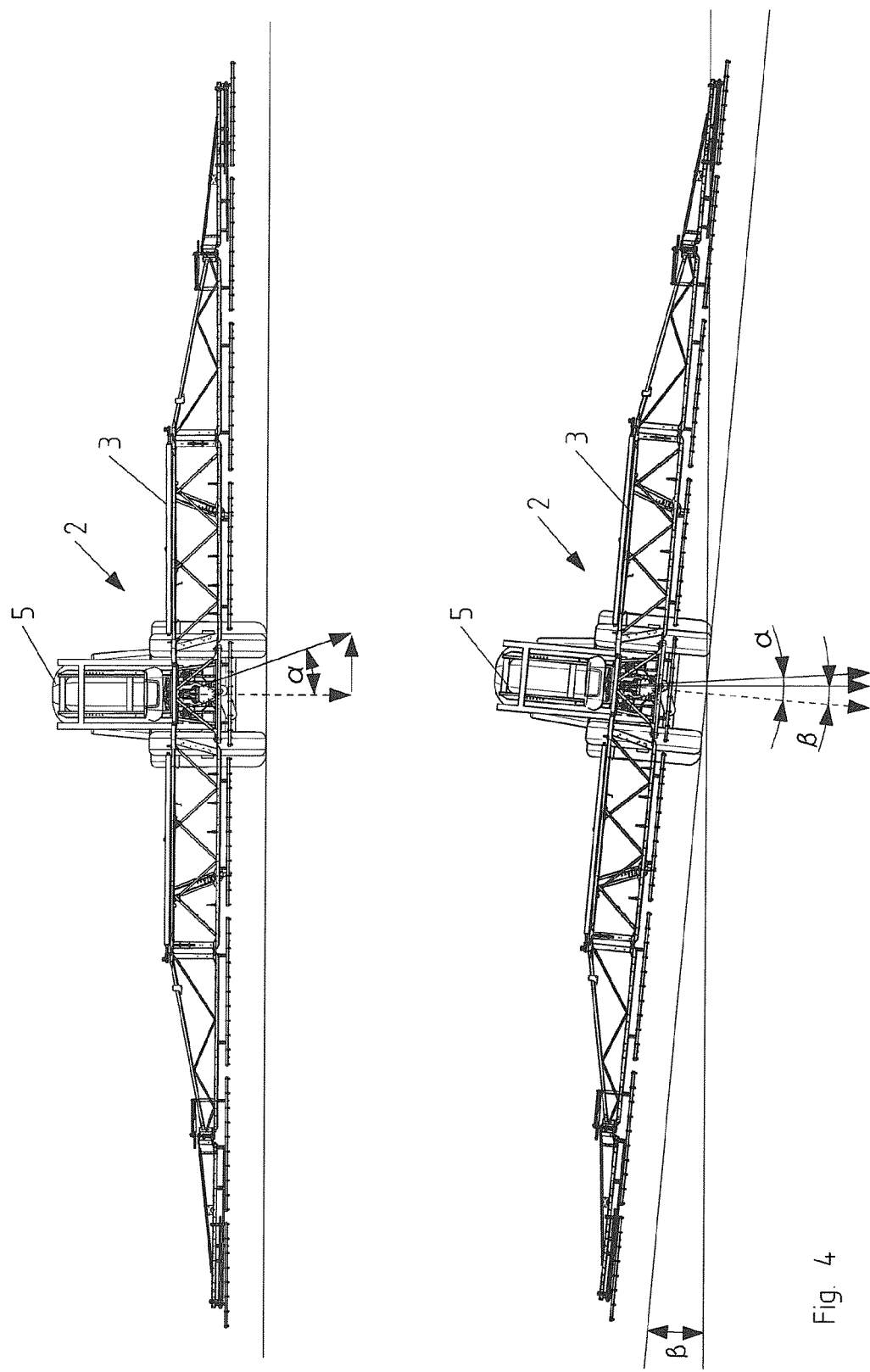

With a left-hand turn, as shown in FIG. 4, lateral accelerations or centrifugal forces arise in dependence of the radius of the curve driven as well as the driving speed. The measured angle deviates from the actual angle both in the parallel position (upper diagram) as well as in the inclined position (lower diagram). In the example of FIG. 4, the deviation, i.e. the error alpha=5°. Specifically, the actual angle in the parallel position (upper diagram) is beta=0°. Due to the lateral acceleration, the measured angle would be, for example, alpha=5°. As explained in more detail in FIG. 6, this error is compensated by the regulating and/or control system, specifically the control system. For this purpose, the angular rate of machine 2 about the vertical axis and the travel speed of the machine are determined and taken into account in the error correction. In the inclined position (lower diagram of FIG. 4) the actual angle is, for example, beta=3°. Due to the inclination of the distributor linkage in the clockwise direction, the deviation from the actual angle beta in a left-hand turn is added, so that the measured angle would be 8° without correction.

Figure 5:
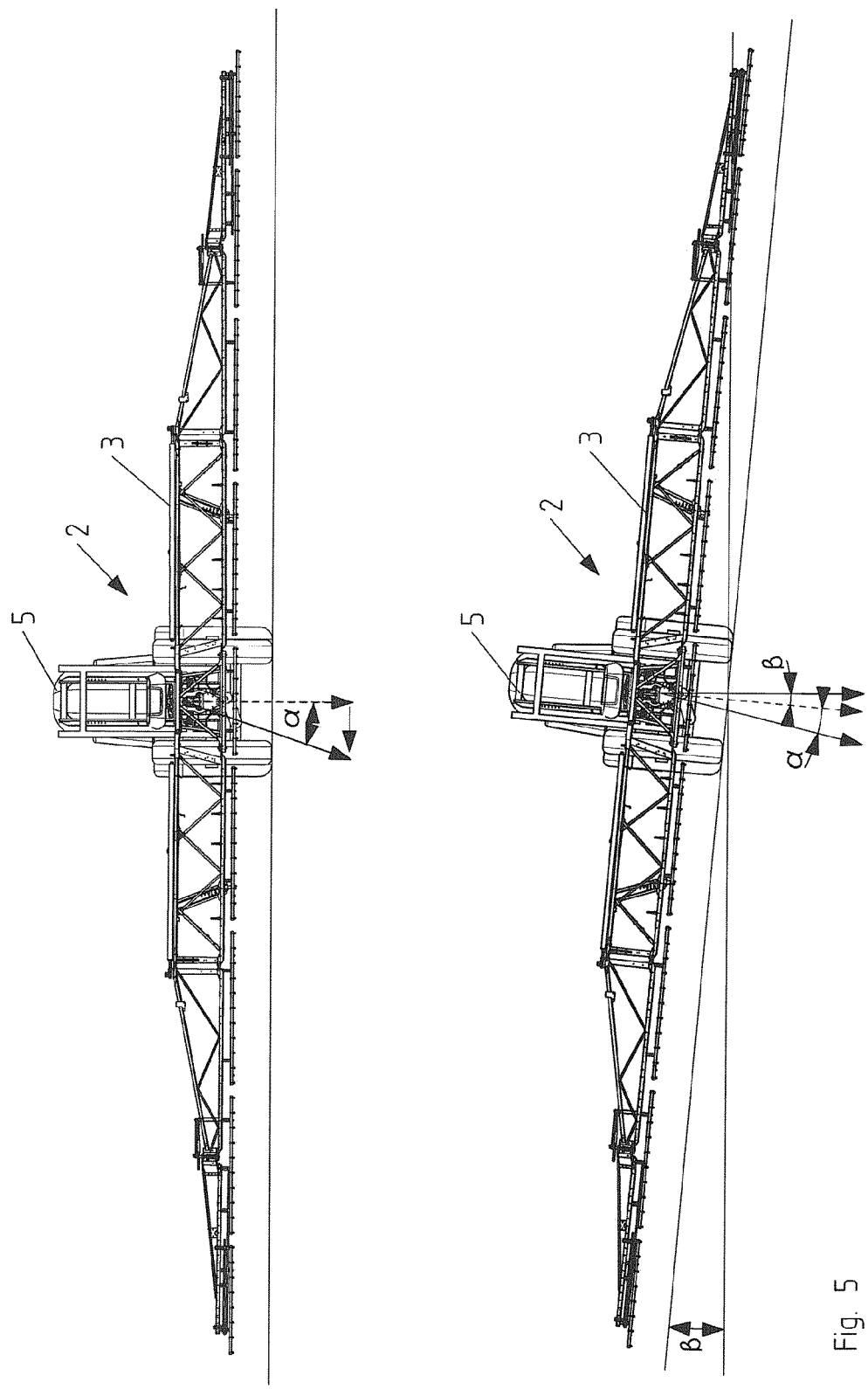

FIG. 5 shows the driving state for a right-hand turn. Transverse accelerations or centrifugal forces again arise there in dependence of the curve radius and the driving speed and lead to a deviation of the measured angle from the actual angle. Since the lateral acceleration acts in the opposite direction as compared to the left-hand turn, the deviation would be alpha=−3°, where the actual angle beta=0° in the parallel position (upper diagram) and the actual angle beta=2° in the inclined position (lower diagram). The error deviation due to the lateral acceleration (alpha=−3°) would result in a measured angle of −1° without correction.

Figure 6:
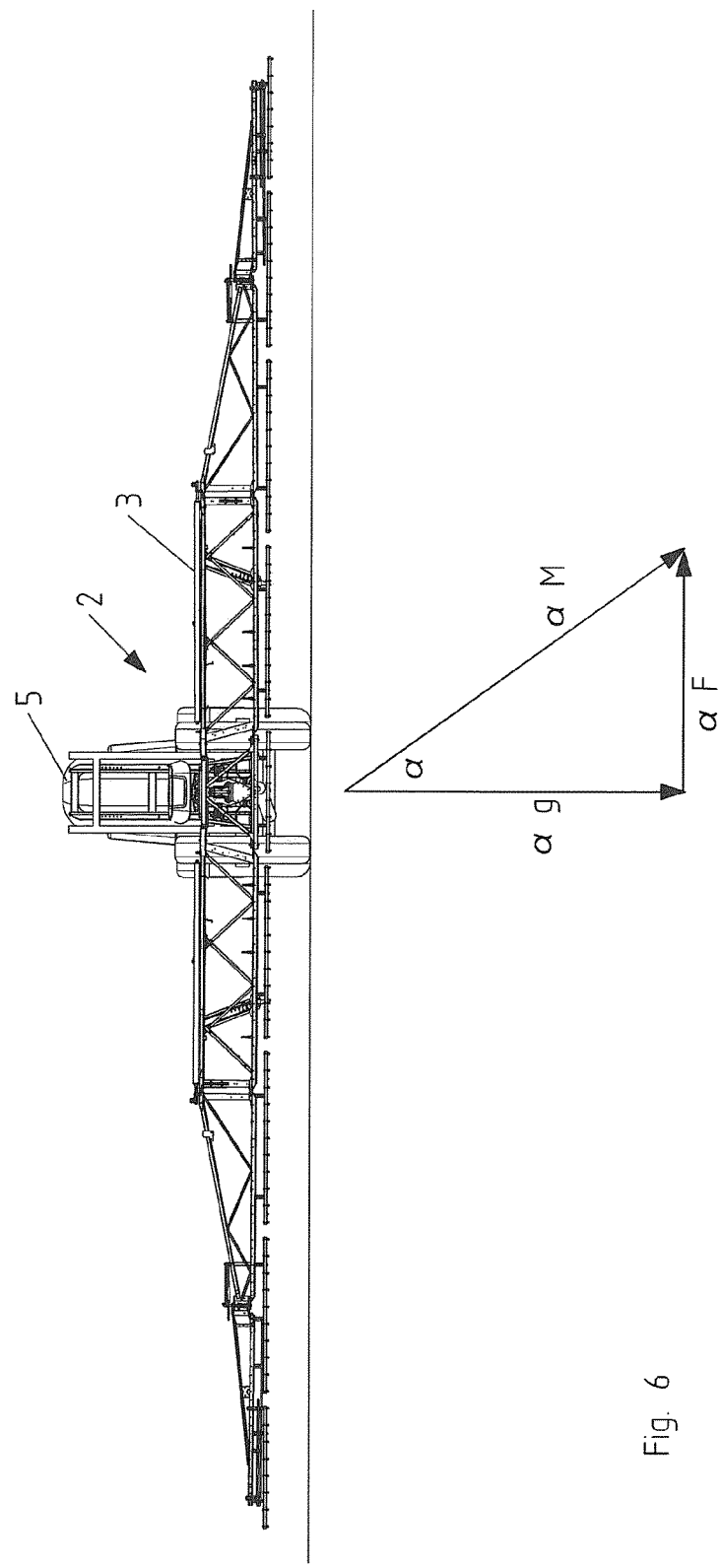

FIG. 6 shows the acceleration diagram in the case of a left-hand turn (see FIG. 4) from which the lateral acceleration and therefore the centrifugal force arises which acts upon the inclination sensor and leads to a measurement error that is corrected by the invention or the embodiment according to the invention, respectively. The linkage is there aligned horizontally to the reference plane normal to the direction of gravity and the natural horizon. Without correction, an incorrect angle alpha relative to the horizon would be determined by the inclination sensor (see also FIG. 4, upper diagram).

The error correction is carried out in a simplified manner based on the angular rate about the vertical axis, which is measured by the second sensor device, and the driving speed which is determined in a manner known per se. A correction term is determined there which corrects the deviation of the measurement acceleration $a_M$ from the acceleration due to gravity $a_G$.

A corresponding correction algorithm is stored in the data processing device. The inventions or the above embodiments are not restricted to the algorithm set forth below, which is to be understood as a possible example of how to correct the measurement error due to the lateral forces, where the angular rate about the vertical axis and the traveling speed of the machine are taken into account, where
r=radius of the curve driven by machine 2
v=travel speed of machine 2
$\dot{\varphi}$=angular rate about the vertical axis of machine 2
$a_g$=gravitational acceleration
$a_M$=measurement acceleration
$a_F$=centrifugal acceleration $$\text{radius of gyration } r = \frac{v}{\dot{\varphi}}$$

$$\text{centrifugal acceleration } a_F = \frac{v^2}{r} = v * \dot{\varphi}$$

$$\text{measurement acceleration } \alpha_M = \sqrt{\alpha_g^2 + \alpha_F^2}$$

$$\text{angle error } \sin \alpha_F = \frac{a_F}{\sqrt{a_g^2 + a_F^2}}$$

for small angles: $\sin \alpha_F = \alpha_F$ $\alpha_g = 9.81$ $$\alpha_g = \alpha_M - \frac{v * \dot{\varphi}}{\sqrt{96 + v^2 * \dot{\varphi}^2}}$$

LIST OF REFERENCE NUMERALS 2 machine
3 distributor linkage
4 distance sensors
5 storage container
6 housing for the second sensor device
a axis of rotation
b center of gravity

The invention claimed is:

1. Regulating and/or control system for an agricultural machine comprising:
   a distributor linkage for spreading material, which is pivotable about at least one axis of rotation extending in a direction of travel, with at least one first sensor device for determining an inclination of said distributor linkage;
   a data processing device for processing sensor signals of the at least one first sensor device; and
   at least one second sensor device for determining a centrifugal force and/or a centrifugal acceleration acting upon the first sensor device when the machine is turning corners by measuring an angular rate of the distributor linkage about a vertical axis, the vertical axis being normal to the at least one axis of rotation extending in the direction of travel,
   wherein said data processing device is configured such that an inclination measurement error of said first sensor device is correctable based on sensor signals of said second sensor device, and
   wherein said second sensor device comprises an angular rate sensor configured to measure the angular rate of said distributor linkage about the vertical axis.

2. The system according to claim 1, wherein:
   said data processing device is adapted to process a travel speed of said machine which is taken into account in an error correction based on the sensor signals of said second sensor device.

3. The system according to claim 2, wherein:
   said data processing device is adapted to factorize the travel speed, where a factorization is adjustable.

4. The system according to claim 1, wherein:
   said data processing device is adapted to process a steering angle of said machine which is taken into account in an error correction based on the sensor signals of said second sensor device.

5. The system according to claim 1, wherein:
   said first sensor device for determining the inclination of said distributor linkage comprises an inclination sensor or an acceleration sensor.

6. The system according to claim 1, wherein:
   at least one third sensor device is provided for determining a distance of said distributor linkage from a ground and/or from a plant population and/or from obstacles.

7. The system according to claim 1, wherein:
   said data processing device is configured for an automatic mode for respective height and/or inclination adjustment of said distributor linkage and for an override mode for respective height and/or inclination adjustment of said distributor linkage, where said data processing device in the automatic mode adjusts an overall height and/or overall inclination of said distributor linkage and in the override mode overrides at least one control parameter of the automatic mode, which is active in the override mode.

8. The system according to claim 1, wherein:
   said data processing device is configured for a manual mode with rigid power transmission to said distributor linkage, where a current inclination value of said distributor linkage is adopted as a new inclination set point when changing over to a decoupling mode with a decoupled distributor linkage to an automatic mode and/or to an override mode.

9. An agricultural machine for spreading fertilizer, plant protection products or seeds, comprising a distributor linkage and the regulating and/or control system according to claim 1.

10. The machine according to claim 9, wherein said second sensor device for determining the centrifugal force and/or the centrifugal acceleration acting upon said first sensor device when the machine is turning corners is arranged on said machine or on said distributor linkage.

11. A method for operating an agricultural machine, in which material is spread from a storage container via a distributor linkage, where in a decoupling mode with said distributor linkage decoupled in an override mode, regulation is effected to an absolute inclination value of said distributor linkage relative to the direction of gravity based on sensor signals of at least one first sensor device for determining the inclination of said distributor linkage, and when corners are turned, a measurement error of said first sensor device is corrected based on sensor signals of at least one second sensor device for determining a centrifugal force and/or a centrifugal acceleration acting upon said first sensor device when said machine is turning corners by measuring an angular rate of the distributor linkage about a vertical axis, the vertical axis being normal to the at least one axis of rotation extending in the direction of travel, wherein said second sensor device comprises an angular rate sensor configured to measure the angular rate of said distributor linkage about the vertical axis.

12. The method according to claim 11, wherein a travel speed and/or a steering angle of said machine are taken into account in a correction of errors based on the sensor signals of said second sensor device.

* * * * *